United States Patent [19]

Brooks

[11] Patent Number: 4,572,948

[45] Date of Patent: Feb. 25, 1986

[54] POSITION INDICATOR EMPLOYING LIGHT GUIDES

[75] Inventor: Robert E. Brooks, Manhattan Beach, Calif.

[73] Assignee: TRW Inc., Cleveland, Ohio

[21] Appl. No.: 513,823

[22] Filed: Jul. 15, 1983

[51] Int. Cl.[4] .............................................. H01J 5/16
[52] U.S. Cl. ........................................ 250/227; 250/221
[58] Field of Search ...................... 250/227, 221, 222.1, 250/229, 231 SE; 350/96.1, 96.15, 96.34; 455/602, 603, 608, 610, 612

[56] References Cited

U.S. PATENT DOCUMENTS

| | | | |
|---|---|---|---|
| 3,327,584 | 6/1967 | Kissinger | 250/227 |
| 3,551,682 | 12/1970 | Kerhoas et al. | 250/227 |
| 3,556,140 | 2/1971 | Granqvist | 250/227 |
| 3,624,404 | 11/1971 | Hines | 250/227 |
| 3,844,378 | 10/1974 | Balogh | 250/227 |
| 4,044,856 | 8/1977 | Stevenson | 250/227 |
| 4,189,206 | 2/1980 | Terai et al. | 250/229 |
| 4,190,318 | 2/1980 | Upton, Jr. | 350/96.2 |
| 4,249,076 | 2/1981 | Bergstrom et al. | 250/231 R |
| 4,459,022 | 7/1984 | Morey | 250/227 |

Primary Examiner—David C. Nelms
Attorney, Agent, or Firm—Yount & Tarolli

[57] ABSTRACT

An apparatus for indicating the position of a movable member, such as a manual control lever, which uses light signals. The apparatus includes at least three light guides and means for introducing distinctively different, cyclically varying light signals into at least two of the light guides. The degree of optical coupling between the third light guide and each of the other two light guides is controlled in accordance with the position of the movable member. An indication of the position of the member is then provided by detecting the third light signal and indicating the extent to which it exhibits the distinctive characteristics of the first and second light signals.

13 Claims, 6 Drawing Figures

POSITION INDICATOR EMPLOYING LIGHT GUIDES

BACKGROUND AND FIELD OF THE INVENTION

The present invention relates to apparatus for controlling an actuator in response to movement of a control member, and in particular to apparatus for sensing the position of a member, such as a control member for an actuator, through use of light guides such as optical fibers.

There are various situations in which it is desirable or necessary that a manual control member be located remote from, and electrically isolated from, the actuator which it controls. So-called "cherry pickers" used by utility companies to lift workers to overhead power lines are examples of such equipment. Conventionally, the cherry picker is mounted on a truck, and consists of a basket attached to the end of a boom. Control levers in the basket control actuators at the base of the boom. The actuators are operable to extend or retract, elevate or lower, and pivot the boom. It is desirable that the manual controls located in the basket be electrically isolated from the ground so that accidental contact with the overhead power lines will not result in grounding of the power line and electrocution of the worker in the basket.

U.S. Pat. No. 4,044,856 (Stevenson) discloses lifting equipment of the "cherry picker" variety, wherein fiber optics are used to control the actuators. Specifically, light signals are used to indicate the positions of the manual control levers. The light signals are communicated back to the base of the boom over optical fiber light guides. At the base of the boom, the light signals are detected and used to control the operation of the actuators. Electrical isolation between the manual control levers and the controlled actuators is assured because each manual control lever is coupled to the controlled actuator only by light guides, which are not themselves electrically conductive.

U.S. Pat. No. 4,044,856 describes a number of arrangements by which the light signals can be controlled by operation of the manual control levers. Other arrangements for controlling light signals in accordance with the position of a movable member are described in U.S. Pat. No. 4,249,076 (Bergstrom et al.). Neither patent describes an arrangement wherein a single light signal is used to indicate deflection of a control lever or other movable member by variable amounts in two different directions.

SUMMARY OF THE INVENTION

The present invention provides apparatus for using light signals to indicate the position of a member, such as a control lever used to control an actuator. The apparatus includes at least three light guides, and means for introducing distinctively different, cyclically varying light signals into at least two of the light guides. The degree of optical coupling between the third light guide and each of the other two light guides is controlled in accordance with the position of the member whose position is to be indicated. An indication of the position of the member can then be provided by detecting the third light signal and indicating the extent to which it exhibits the distinctive characteristics of the first and second light signals.

With this arrangement, only a single light detector is required since a single light signal indicates both the direction and magnitude of deflection of the movable member.

BRIEF DESCRIPTION OF THE DRAWINGS

The foregoing and other objects and advantages of the present invention will become more readily apparent from the following detailed description, as taken in conjunction with the accompanying drawings, wherein.

DETAILED DESCRIPTION

As used herein, the term "light" is intended to refer to not only visually perceptible light, but also to ultraviolet light and infrared light.

Figure 1:
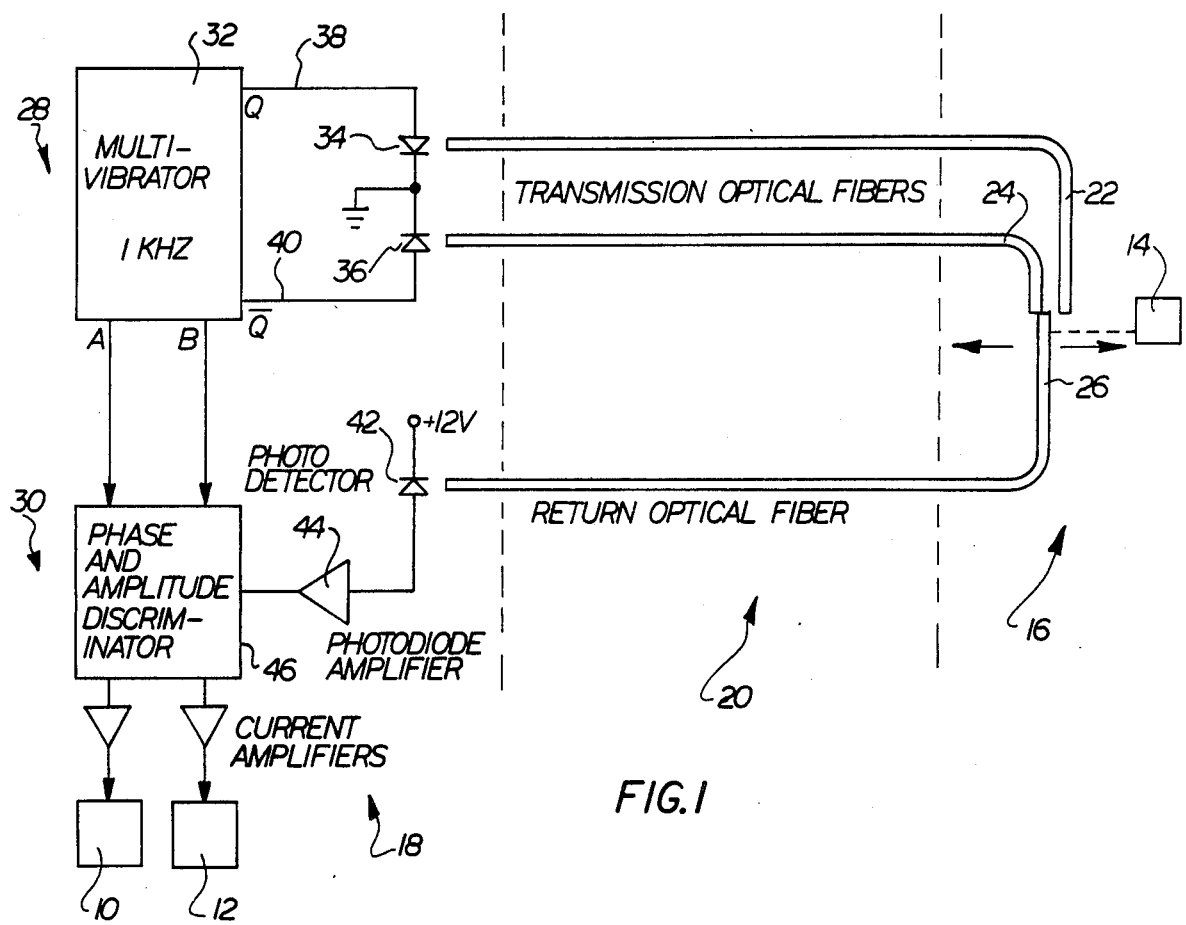
FIG. 1 is a block diagram of position sensing apparatus in accordance with the teachings of the present invention.

In FIG. 1, two actuators 10 and 12 are controlled in accordance with the position of a movable member 14, such as a control lever. The apparatus includes a control lever assembly 16, an actuator control assembly 18, and a fiber optic interconnection cable arrangement 20 joining the control lever assembly 16 and the actuator control assembly 18. When used on a "cherry picker" truck, the control lever assembly 16 is located in the basket and the actuator control assembly 18 is located at the base of the boom. The actuators 10 and 12 will control movement of the basket in response to manual movement of the control lever. The interconnection cable arrangement 20 joining the two assemblies 16 and 18 carries light signals rather than electrical signals, and is not electrically conductive. The control lever assembly 16 is therefore electrically isolated from the actuator control assembly 18.

The interconnection cable arrangement 20 comprises three light guides 22, 24 and 26. Two of the light guides 22 and 24 carry light signals from the actuator control assembly 18 to the control lever assembly 16. The two light signals are distinctively different. The third light guide 26 returns a light signal from the control lever assembly 16 back to the actuator control assembly 18. The control lever assembly 16 controls the degree of optical coupling between the light guide 26 and each of the other light guides 22 and 24 such that the light signal appearing in the return light guide 26 exhibits the distinctive characteristic of one of the two light signals. The actuator control assembly 18 detects the light signal appearing in the return light guide 26 and controls the actuators 10 and 12 in accordance with the extent to which the light signal exhibits the distinct characteristics of the light signals appearing in the light guides 22 and 24.

The three light guides 22, 24 and 26 are flexible optical fibers of conventional construction. Each of the light guides thus includes an optically transparent core surrounded by a thick, optically opaque jacket. Light signals are coupled into or out of the optical fibers at the ends of each fiber. As shown in the Figure, each of the optic fibers has one end disposed within the actuator control assembly 18 and a second end disposed within the control lever assembly 16.

The actuator control assembly 18 includes two circuits 28 and 30. The first circuit 28 generates two distinctively different light signals and couples the light signals into the optical fibers 22 and 24. The other circuit 30 detects the light signal returned in the third optical fiber 26 and controls the two actuators 10 and 12 in accordance with the characteristics of the detected signal.

The light signal generating circuit 28 includes a multivibrator 32 and two light emitting diodes (LED's) 34 and 36. The multivibrator 32 generates two rectangular wave signals which are out of phase with one another. The two signals are applied to output lines 38 and 40. LED 34 is coupled between the output line 38 and ground, and LED 36 is coupled between the other output line 40 and ground.

Figure 2:
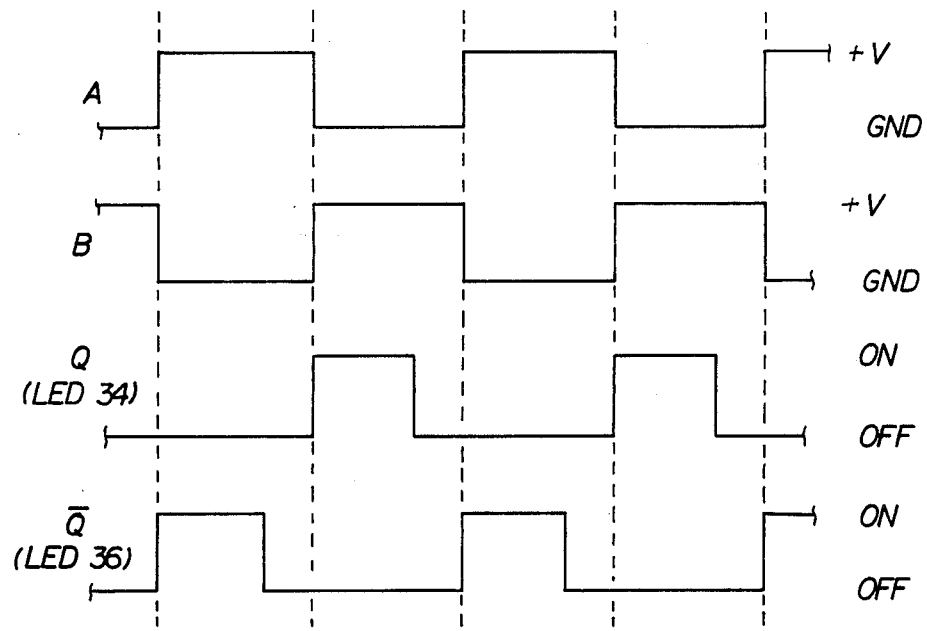
FIG. 2 is a series of timing diagrams useful in understanding the operation of the position sensing apparatus of FIGS. 1 and 3.

The rectangular wave signals provided on output lines 38 and 40 have the same frequency (approximately 1 KHz, in the example being described) but are 180° out of phase (see FIG. 2). Whenever one of the signals is at a positive level (thereby energizing its corresponding LED), the other signal is at a ground potential (whereby its corresponding LED is not energized). Cyclically varying light signals are thus generated by LEDs 34 and 36.

Each of the light emitting diodes 34 and 36 is optically coupled to a first end of a corresponding one of optical fibers 22 and 24. Since LEDs 34 and 36 are alternately energized, light is transmitted in only one of the two fibers at any given time.

The phase of the light signal in the return optical fiber 26 (relative to the multivibrator signals) is dependent upon which of the two transmission optical fibers 22 or 24 the fiber 26 is receiving its light signal from. The magnitude of the light signal in the return optical fiber, on the other hand, is dependent upon the degree of the optical coupling between the return optical fiber and one of the transmission optical fibers. Since both of these characteristics are controlled by the position of the member 14, it follows that the phase and the amplitude of the light signal in the return fiber 26 are indicative of the position of the member 14.

In the embodiment shown in FIG. 1, the degree of optical coupling between the return optical fiber 26 and the transmission optical fibers 22 and 24 is controlled by controlling the lateral position of the second end of optical fiber 26 relative to the second ends of the transmission fibers 22 and 24. The segments of the fibers 22 and 24 near their second ends are disposed parallel to one another, with their ends opening in the same direction and being even with one another. The ends of fibers 22 and 24 are laterally displaced from one another by a distance approximately equal to the diameter or width of the transparent cores of the optical fibers. The end segment of the return fiber 26 is disposed parallel to the end segments of fibers 22 and 24, but with its open end facing in the opposite direction. The open end of return fiber 26 is in substantially the same plane as the open ends of optical fibers 22 and 24.

Fiber 26 is coupled to the member 14 such that movement of the member causes lateral movement of the end segment of the return fiber 26. The optical fiber 26 is movable between a first position wherein it is in optical alignment with fiber 22 and a second position wherein it is in optical alignment with fiber 24. When in the first position, there is a maximum coupling between the transmission fiber 22 and the return fiber 26. When in the second position, on the other hand, there is a maximum coupling between the transmission fiber 24 and the return fiber 26. When the return fiber 26 is located in a lateral position midway between the first and second positions, it receives essentially no light from either of the transmission fibers 22 and 24. Thus, lateral movement of the fiber 26 between the first and second positions controls the extent of coupling between the fiber 26 and each of the other two fibers 22 and 24.

The light detector and actuator control circuit 30 includes a photosensitive semiconductor element 42 which is optically coupled to the first end of the return fiber 26. The resistance of the photodetector element 42 is dependent upon the magnitude of the light to which the photodetector is exposed. Consequently, the resistance of the photodetector element 42 varies in direct relation to the magnitude of the light in the return fiber 26. The variations in the resistance value of the photodetector element 42 produce corresponding variations in the electrical signal at the input to an amplifier 44, which amplifies the signal to provide an output signal to a phase and amplitude discriminator circuit 46.

The phase and amplitude discriminator circuit actuates one of actuators 10 or 12 in accordance with the phase of the light signal relative to the light signals provided by multivibrator 32. Thus, for example, if the photodetector 42 is being illuminated at the same time that LED 34 is energized, then actuator 10 is energized to an extent dependent upon the amplitude of the return signal in the return fiber 26. If the photodetector 42 is illuminated at the same time that the LED 36 is energized, however, then the other actuator 12 is actuated to an extent dependent upon the amplitude of the return signal in the return fiber 26. Thus, the light detector and actuator control circuit 30 controls the actuators 10 and 12 in accordance with the position of the movable member 14.

Figure 3:
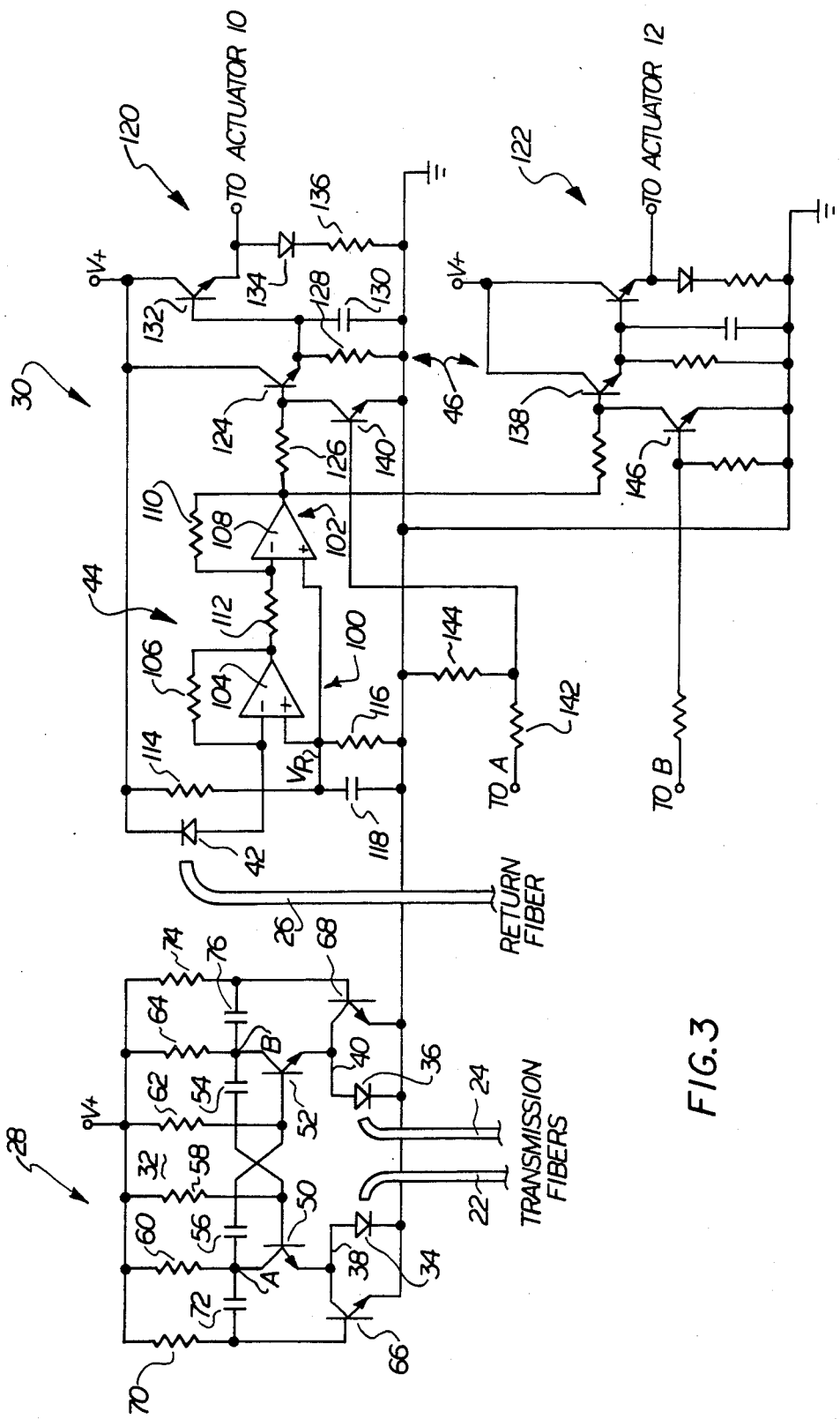
FIG. 3 is a circuit schematic of one embodiment of the apparatus shown in block diagram form in FIG. 1.

FIG. 3 is a circuit schematic of the two sections 28 and 30 of the actuator control assembly 18 of FIG. 1. In the embodiment shown in FIG. 3, the heart of the multivibrator 32 is two cross-coupled NPN bipolar junction transistors 50 and 52. The base of transistor 50 is connected to the collector of transistor 52 through a capacitor 54 and the base of transistor 52 is connected to the collector of transistor 50 through a similar capacitor 56. The bases and collectors of both transistors are all connected to a +V supply line through corresponding resistors 58, 60, 62 and 64. The circuit including the transistors 50 and 52 and the associated components 54–64 is a conventional astable multivibrator circuit whose general characteristics and operation are well understood in the art. (See, for example, "Pulse, Digital, and Switching Waveforms", by Millman and Taub, 1965 McGraw-Hill, pages 438–441.) Generally stated, the conductive states of the two transistors 50 and 52 alternate at a frequency determined by the values of resistors 58 and 62 and capacitors 54 and 56. When transistor 50 is conductive, transistor 52 is nonconductive, and vice-versa. The resistor and capacitor values are preferably selected such that the transistors 50 and 52 switch on and off at a frequency of approximately 1 kHz, and have equal on and off times.

Light emitting diode 34 is connected between the emitter of transistor 50 and ground, whereas light emitting diode 36 is connected between the emitter of transistor 52 and ground. The light emitting diodes are thus each connected in series with the current path through one of the transistors, and, but for the operation of transistors 66 and 68, LEDs 34 and 36 would each receive current whenever the associated transistor were active. Thus, if transistors 66 and 68 were not included in the circuit, light emitting diodes 34 and 36 would each emit light whenever its respective transistor were conductive. Transistors 50 and 52 change conductive states at essentially the same time, hence light emitting diode 34 would begin transmitting light at approximately the same time that light emitting diode 36 stopped transmitting light, and vice-versa.

Transistors 66 and 68 and their associated resistor and capacitor components are included in order to disable the light emitting diodes 34 and 36 for a brief period in each cycle, so that the ON times of the two diodes do not approach one another. Transistor 66 is biased to an ON condition by resistor 70. As long as transistor 66 is ON, current flow from the emitter of transistor 50 is shorted to ground through the transistor 66, thus bypassing the light emitting diode 34. Capacitor 72, however, causes the transistor 66 to switch to a nonconductive state (i.e., to turn OFF) for a brief period each time the transistor 50 switches to a conductive state. As long as transistor 66 is OFF and transistor 50 is ON, LED 34 is energized. Transistor 66 remains OFF, however, for only a portion of the interval during which the transistor 50 is conductive. Consequently, before transistor 50 becomes nonconductive, transistor 66 turns on again, thereby disabling LED 34 for the remainder of the conductive period of transistor 50.

In similar fashion, transistor 68 normally disables LED 34, but is turned OFF for a short period of time immediately after transistor 52 becomes conductive, whereby LED 36 is then briefly energized. Before transistor 52 becomes nonconductive, however, transistor 68 becomes conductive once again, shunting current past LED 36 and thereby turning it off.

The resulting ON and OFF times of LEDs 34 and 36 are graphically indicated in the waveforms shown in FIG. 2, which represent the energization states of the light emitting diodes as a function of time. Also shown in FIG. 2 are waveforms representing the voltage signals appearing at the collectors of transistors 50 and 52 as a function of time. These voltage signals are used in the phase and amplitude detector circuits described below.

In the embodiment shown in FIG. 3, a photo diode 42 is used to convert the returned light signal into an electrical signal. The photo diode 42 has a photosensitive surface and a resistance value which is dependent upon the amount of light falling upon the photosensitive surface. The photo diode is connected between a +V supply rail and the input to the amplifier 44. In the FIG. 3 embodiment, the amplifier 44 includes two cascaded amplifier stages 100 and 102 of conventional construction. The two amplifier stages 100 and 102 are similar. Amplifier stage 100 includes an integrated circuit differential amplifier 104 having its positive input terminal connected to a reference voltage source $V_R$ and its negative input terminal connected to the photo diode 42. A negative feedback resistor 106 is connected between the output of the amplifier 104 and its negative input. The second amplifier stage 102 is similar to the first, and also includes an operational amplifier 108 and a negative feedback resistor 110. The output of the first stage 100 is supplied to the negative input of the operational amplifier 108 through an input resistor 112. The output signal from the integrated circuit differential amplifier 108 is directly dependent upon the resistance value of photo diode 42, and thus upon the intensity of the light signal in return optical fiber 26.

The reference signal applied to the noninverting inputs of operational amplifiers 104 and 108 is established by a resistive voltage divider including resistors 114 and 116 connected in series between the +12 volt supply rail and ground. The reference voltage at the junction between resistors 114 and 116 is stabilized and filtered by a capacitor 118 which is connected between the junction of the resistors and ground.

The output signal provided by the second amplifier stage 102 is applied to two identical peak detector circuits 120 and 122, each including an emitter-follower transistor amplifier having a capacitor connected across its emitter resistor. The emitter-follower portion of peak detector 120 includes an NPN bipolar junction transistor 124 having its base connected to the output of the amplifier 102 through an input resistor 126, and its collector connected to the +V supply rail. The emitter of the transistor 124 is connected to ground through an emitter resistor 128. A peak holding capacitor 130 is connected in parallel with the emitter resistor 128.

The emitter-follower provides an output voltage which follows the peaks of the input signal. If the input voltage (i.e., the signal at the base of transistor 124) is greater than the capacitor voltage, the base-emitter junction of the transistor becomes conductive and hence the input signal is transmitted to the capacitor. Thus, as long as the input signal is increasing towards a peak, the capacitor voltage follows the input voltage. When the input signal begins decreasing in amplitude following the peak, the input signal becomes smaller than the capacitor voltage. The base-emitter junction of the transistor is then reverse biased and is thus nonconductive. Capacitor 130 discharges from the peak voltage value through resistor 128. The value of resistor 128 is selected, however, so that the voltage signal does not decay by a substantial amount in the time between successive light return pulses. If the peak amplitude of the pulses in the return signal diminishes, however, the voltage across the capacitor 130 will similarly diminish since the decaying capacitor voltage will not be fully replenished by succeeding pulses.

The voltage across capacitor 130 is used to control actuator 10 (see FIG. 1). The voltage signal across capacitor 130 is applied to the actuator through a second emitter-follower amplifier, represented in FIG. 3 by transistor 132. The base of transistor 132 is connected to the capacitor 130, whereas its emitter is connected to the input terminal of actuator 10. The voltage at the emitter of transistor 132, and thus the voltage across actuator 10, is equal to the voltage across capacitor 130 minus the small voltage drop which exists across the base-emitter junction of transistor 132. A visual indication of the energization state of actuator 10 is provided by a light emitting diode 134, which is connected in series with a resistor 136 between the emitter of transistor 132 and the ground terminal. The light emitted by the light emitting diode 134 is directly proportional to the amplitude of the signal at the emitter of transistor 132.

The peak detector circuit 120 includes additional components which cause it to respond to only those peaks which occur in-phase with a selected one of the two phases of light signals provided by light generating circuit 28. The additional components disable transistor 124, and thus peak detector 120, each time that light emitting diode 36 is ON. Thus, if the return light signal only includes pulses from LED 36, the output signal applied to actuator 10 is of zero amplitude.

The peak detector disablement circuit for peak detector 120 includes a transistor 140 whose collector is connected to the base of transistor 124 and emitter is connected to ground. The base of transistor 140 is connected to the collector of transistor 50 in multivibrator 32 (i.e., to circuit node A) through a resistor 142. A second resistor 144 is connected between the base of transistor 140 and ground. Transistor 140 is ON whenever the voltage at the collector of transistor 50 is at a high voltage level, and is OFF otherwise. Whenever transistor 140 is ON, the base of transistor 124 is effectively grounded, thereby preventing it from being enabled. As a result, peak detector circuit 120 is disabled during the time that the voltage at the collector of transistor 50 (in the astable multivibrator circuit 32) is at a positive voltage level. As is apparent from the waveforms of FIG. 2, the voltage (A) at the collector of transistor 50 is always at a high voltage level when light emitting diode 36 is energized. Peak detector 120 therefore only responds to pulses from LED 34.

Peak detector 122 is identical to peak detector 120, except that it is enabled at different times. The peak detector disablement transistor 146 of peak detector circuit 122 is connected to the collector of transistor 52 in the multivibrator circuit 32 (i.e., to circuit node B), rather than transistor 50. Consequently, peak detector circuit 122 is disabled during the time that light emitting diode 34 is energized. Peak detector 122 therefore only responds to pulses from LED 36. The output of peak detector 122 is connected to actuator 12.

In summary, the circuit shown in FIG. 3 operates to energize either actuator 10 or actuator 12, depending upon whether the signal returned by return fiber 26 is in phase with the signal in optical fiber 24 or with the signal in optical fiber 22. The extent of energization of the actuator 10 or 12 is dependent upon the amplitude of the return signal, which in turn is dependent upon the efficiency of coupling between the return optical fiber 26 and the transmission optical fibers 22 and 24.

Figure 4:
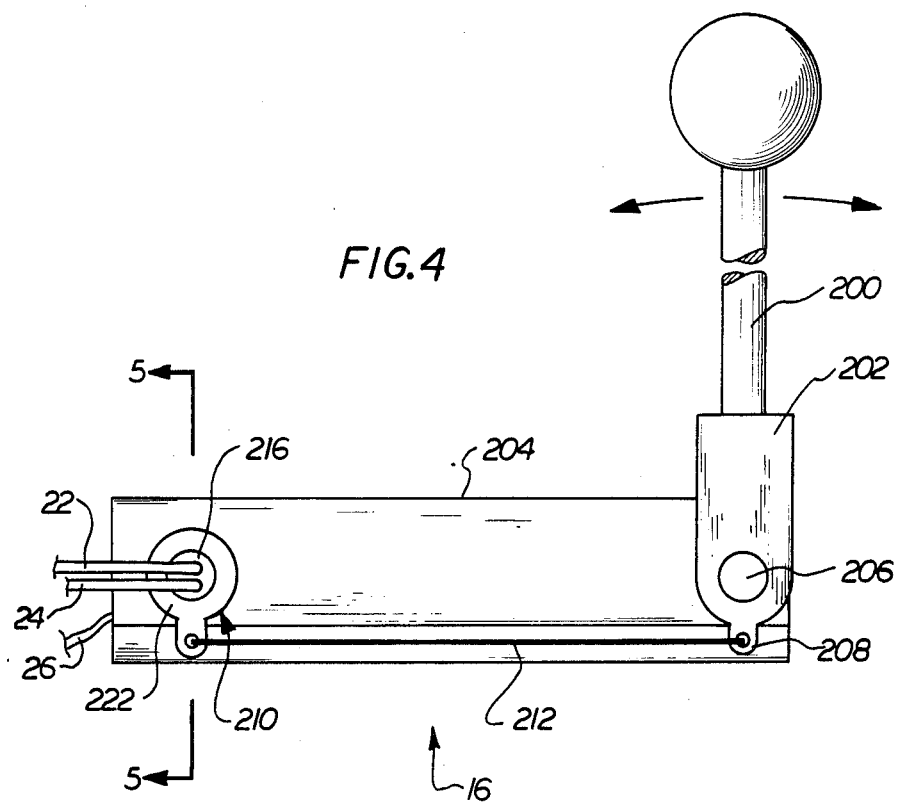
FIG. 4 is an elevation view of a mechanism for manually controlling the coupling between the optical fibers used in the apparatus of FIGS. 1 and 3.
Figure 5:
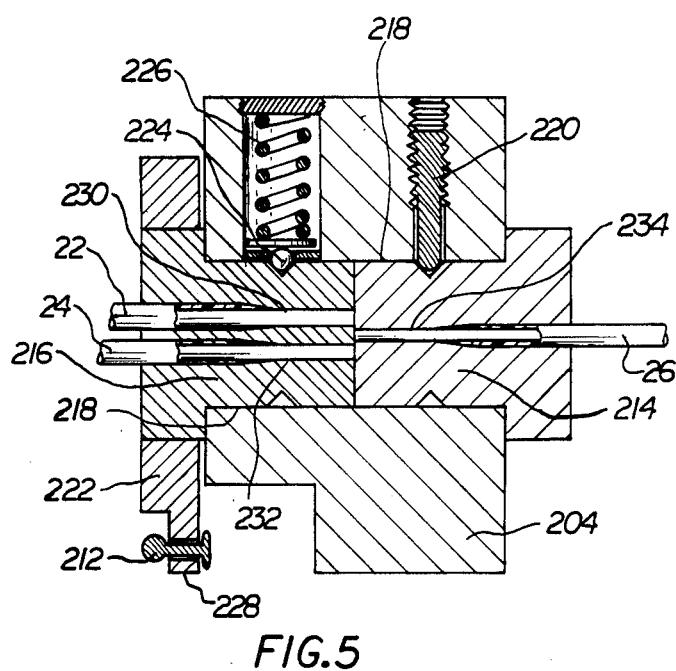
FIG. 5 is a sectional view, taken approximately along line 5—5 of FIG. 4.
Figure 6:
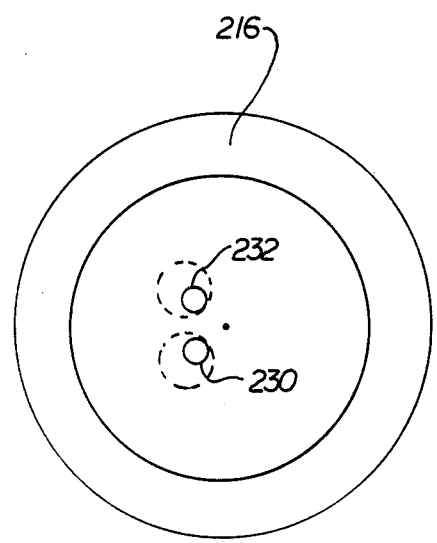
FIG. 6 is an end view of a part used in the mechanism of FIGS. 4 and 5.

As indicated above, the control lever assembly 16 positions the return optical fiber 26 relative to the two transmission optical fibers 22 and 24. The assembly 16 may take many different forms. One example of a form which the mechanism may take is shown in FIGS. 4–6. In the embodiment shown in FIG. 4, the object whose position is to be detected is a control lever 200. The control lever 200 has a clevis 202 formed at one end. The clevis is attached to a frame 204 by a clevis pin 206. The control lever is free to pivot around clevis pin 206. One of the prongs of the clevis has a projecting tab 208 which is connected to a rotating optical fiber coupling assembly 210 by a linkage rod 212. As can best be seen in FIG. 5, the assembly 210 includes two fiber termination ferrules 214 and 216 which are assembled through opposite ends of a through hole 218 in the frame 204. The ferrules 214 and 216 are cylindrical and are long enough that their interior end faces abut one another. Ferrule 214 is held in place by a set screw 220. Ferrule 216 is held in place by a ball 224 which is biased against an annular groove in the ferrule 216 by a spring 226. Ferrule 216 is thus rotatable within the through hole. A linkage ring 222 is fastened (by another set screw, not shown) to the protruding portion of ferrule 216. The linkage ring 222 has a radially projecting tab 228 to which the second end of the linkage rod 212 is attached. Rotation of the control lever 200 about clevis pin 206 produces corresponding rotation of the ferrule 216 relative to the ferrule 214 due to the coupling provided by linkage rod 212.

Ferrule 216 has two generally parallel holes 230 and 232 drilled axially through it and located eccentrically relative to its horizontal axis. (The sectional view of FIG. 5 is taken along an off-axis path through the ferrules 214 and 216 so that the holes 230 and 232 can be seen.) Optical fiber 22 extends through hole 230, and optical fiber 24 extends through hole 232. Before the fibers are inserted and glued into the holes, the jackets of the fibers are stripped back so that the transparent cores alone protrude through the end faces of the ferrule. The protruding ends of the optical fibers 22 and 24 are cut and ground flush with the ferrule end face. The return optical fiber 26 is mounted in a similar manner, through an axial, off center hole 234 in the ferrule 214. Each of the holes in the ferrules intersects the interior end face of its ferrule at a transverse location which is displaced from the center of the ferrule by the same amount. As a result, the return optical fiber 26 is aligned with one or the other of the transmission optical fibers 24 and 22 at certain rotational positions.

The circumferential orientation of the linkage ring 222 relative to the ferrule 216 is such that when the control lever 200 is in its central position, the end of optical fiber 26 is disposed midway between the ends of the other two optical fibers 22 and 24. Thus, if the control lever 200 is rotated in one direction and the ferrule 216 thus rotated in the same direction the end face of return optical fiber 26 overlaps and receives light from the end face of one of the transmission optical fibers 22 and 24. Rotation of the control lever 200 in the opposite direction, however, results in the end face of optical fiber 26 overlapping and receiving light from the end face of the other of the transmission optical fibers. As the control lever is displaced from its central position by greater amounts, the end face of the return optical fiber 26 more fully overlaps an end face of one of the two transmission optical fibers, thereby increasing the amplitude of the light signal returned by the optical fiber 26. The optical coupling between optical fiber 26 and each of the other two fibers 22 and 24 is thus directly indicative of the direction and extent of deflection of control lever 200 from its central position.

Although the invention has been described with respect to a preferred embodiment, it will be appreciated that various rearrangements and alterations of parts may be made without departing from the spirit and scope of the present invention, as defined in the appended claims.

What is claimed is:

1. Apparatus for use with a movable member, comprising:
   first, second and third light guide means,
   means for introducing a first cyclically varying light signal into said first light guide means and a second cyclically varying light signal into said second light guide means, said cyclical variations of said first and second light signals being distinctively different, means for controlling the degree of optical coupling between said third light guide means and each of said first and second light guide means in accordance with the position of said member, and means for detecting the light signal in said third light guide means and for providing an indication in accordance with the extent to which said light signal exhibits the distinctive characteristics of said first or second light signals.

2. Apparatus as set forth in claim 1, wherein said light signal introducing means comprises means for introducing first and second light signals which cyclically vary at the same frequency but at different phases.

3. Apparatus as set forth in claim 2, wherein said detecting means includes means for determining the phase of the light signal in said third light guide means relative to the phases of said first and second light signals, and for providing an indication in accordance with said relative phase.

4. Apparatus as set forth in claim 2, wherein said detecting means includes means for providing an indication in accordance with both (a) the amplitude of the light signal in said third light guide means and (b) the relationship between the phase of said light signal in said third light guide means and the phases of said first and second light signals.

5. Apparatus as set forth in claim 1, wherein said optical coupling controlling means comprises means for coupling said third light guide means to either said first light guide means or said second light guide means in accordance with the position of said member.

6. Apparatus as set forth in claim 1, wherein each of said first, second and third light guide means has at least one end, and wherein said optical coupling means comprises means for positioning the end of said third light guide means relative to the ends of said first and second light guide means in accordance with the position of said member.

7. Apparatus as set forth in claim 6, wherein said means for positioning the end of said third light guide means comprises means for moving said end from axial alignment with the end of said first light guide means to axial alignment with the end of said second light guide means as said member is moved between two extreme limits of movement.

8. Apparatus as set forth in claim 1, wherein said means for introducing said light signals comprises first and second light sources optically coupled to said first and second light guide means, respectively, and means for periodically energizing first one and then the other of said light sources so that a light signal is provided by only one of said light sources at a time.

9. Apparatus as set forth in claim 8, wherein said detecting means includes a single light detector responsive to the light signal in said third light guide means for providing an electrical signal in accordance therewith, and phase detector means responsive to said electrical signal for providing an output indication representative of the phase of said electrical signal relative to the phases of the periodic energization of said first and second light sources.

10. Apparatus comprising:
(a) a member the position of which is to be indicated;
(b) first, second and third light guide means, each having first and second ends;
(c) source means for applying cyclically varying light to the first end of each of said first and second light guide means, the light applied to one of said two light guide means being out of phase with the light applied to the other of said two light guide means;
(d) coupling means coupled to said member for coupling the second ends of said first and second light guide means to the second end of said third light guide means and for controlling the degrees of optical coupling between said first and third light guide means, on the one hand, and said second and third light guide means, on the other hand, in accordance with the position of said member; and
(e) detector means coupled to the first end of said third light guide means for providing an indication in accordance with at least the relationship between the phase of the light in said third light guide means and the phases of said cyclically varying light applied to said first and second light guide means, said indication thus indicating the position of said memeber.

11. Apparatus as set forth in claim 10, wherein said source means applies light to only one of said light guide means at a time.

12. Apparatus as set forth in claim 10, wherein said member whose position is to be indicated comprises a manual control lever.

13. Apparatus as set forth in claim 12, and further comprising at least one actuator for controlling movement of a member and means for controlling said at least one actuator in accordance with said indication provided by said detector means, whereby said at least one actuator is controllable by said manual control lever.

* * * * *